(12) United States Patent
Ragot et al.

(10) Patent No.: US 12,725,880 B2
(45) Date of Patent: Sep. 1, 2026

(54) ELECTRIC ENERGY STORAGE SYSTEM FOR A VEHICLE

(71) Applicant: VOLVO TRUCK CORPORATION, Gothenburg (SE)

(72) Inventors: Sebastien Ragot, Gothenburg (SE); Jonatan Hörder, Mölndal (SE); Istaq Ahmed, Hisings Backa (SE); Natalie Ljungdahl, Öjersjö (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 924 days.

(21) Appl. No.: 17/996,741

(22) PCT Filed: Apr. 22, 2020

(86) PCT No.: PCT/EP2020/061186

§ 371 (c)(1),
(2) Date: Oct. 20, 2022

(87) PCT Pub. No.: WO2021/213645

PCT Pub. Date: Oct. 28, 2021

(65) Prior Publication Data

US 2023/0223647 A1 Jul. 13, 2023

(51) Int. Cl.
*H01M 50/383* (2021.01)
*H01M 10/48* (2006.01)
(Continued)

(52) U.S. Cl.
CPC ......... *H01M 50/383* (2021.01); *H01M 10/48* (2013.01); *H01M 10/613* (2015.04); *H01M 10/6568* (2015.04); *H01M 2010/4278* (2013.01)

(58) Field of Classification Search
CPC ............. H01M 50/383; H01M 10/613; H01M 10/6568; H01M 10/48
See application file for complete search history.

(56) References Cited

U.S. PATENT DOCUMENTS

2010/0136391 A1* 6/2010 Prilutsky ........... H01M 10/6566 429/62
2019/0168038 A1* 6/2019 Lian .................... H01M 50/249
2020/0127346 A1* 4/2020 Noda .................... H01M 10/63

FOREIGN PATENT DOCUMENTS

CN 102576838 A 7/2012
CN 103147838 A 6/2013
(Continued)

OTHER PUBLICATIONS

Chinese Office Action dated Oct. 30, 2024 in corresponding Chinese Patent Application No. 202080099941.9, 22 pages.
(Continued)

*Primary Examiner* — Olatunji A Godo
(74) *Attorney, Agent, or Firm* — Jeffri A. Kaminski; Venable LLP

(57) ABSTRACT

An electric energy storage system for a vehicle, comprising a battery unit, a easing enclosing the battery unit, a cooling system comprising at least one coolant conduit arranged for cooling of the at least one battery tint during normal operation of the energy storage system by circulating coolant fluid through the at least one, coolant conduit, a means for detecting a thermal runaway within the electric energy storage system, a valve arrangement being configured to respond to the detection of a thermal runaway by releasing coolant fluid from the cooling system into the casing, foam-forming substance being configured to produce a foam when coming into contact with the coolant fluid and/or when the coolant fluid is released into the casing.

20 Claims, 3 Drawing Sheets

(51) Int. Cl.

| | |
|---|---|
| ***H01M 10/613*** | (2014.01) |
| ***H01M 10/6568*** | (2014.01) |
| *H01M 10/42* | (2006.01) |

(56) References Cited

FOREIGN PATENT DOCUMENTS

| | | | |
|---|---|---|---|
| CN | 103779629 | A | 5/2014 |
| CN | 209071461 | U | 7/2019 |
| CN | 110199406 | A | 9/2019 |
| DE | 102009018442 | A1 | 10/2010 |
| DE | 102010030881 | A1 | 1/2012 |
| DE | 102016223004 | A1 | 5/2018 |
| EP | 2302727 | A1 | 3/2011 |
| EP | 3333932 | A1 | 6/2018 |
| EP | 3553420 | A2 | 10/2019 |

OTHER PUBLICATIONS

International Search Report and Written Opinion in corresponding International Application No. PCT/EP2020/061186 mailed Mar. 2, 2021 (10 pages).

International Preliminary Report on Patentability in corresponding International Application No. PCT/EP2020/061186 mailed Sep. 7, 2022 (7 pages).

* cited by examiner

ELECTRIC ENERGY STORAGE SYSTEM FOR A VEHICLE

CROSS-REFERENCE TO RELATED APPLICATIONS

This application is a U.S. National Stage application of PCT/EP2020/061186, filed Apr. 22, 2020 and published on Oct. 28, 2021, as WO 2021/213645, all of which is hereby incorporated by reference in its entirety.

TECHNICAL FIELD

The invention relates to an electric energy storage system for a vehicle. The invention further relates to a method for emergency cooling of such an electric energy storage system, a control unit, a computer program, a computer readable medium, and a vehicle.

The invention can be applied in any type of hybrid vehicles or electrical vehicles, such as partly or fully electrical vehicles. Although the invention will be described with respect to an electrical bus, the invention is not restricted to this particular vehicle, but may also be used in other hybrid or electrical vehicles such as electrical trucks, electrical construction equipment, and electrical passenger cars. The invention may also be applied in any other type of electrical vehicle such as electrically powered construction equipment, electrical working machines, e.g. wheel loaders, articulated haulers, dump trucks, excavators and backhoe loaders etc.

BACKGROUND

Batteries are becoming a more common source of power for providing propulsion for vehicles. Such batteries are often rechargeable batteries and typically include a number of battery cells that may be connected in series or in parallel forming a complete battery pack for the vehicle, included in an electric energy storage system of the vehicle.

It is well-known that batteries generate heat during charge and discharge cycles of the battery, and electrically operated vehicles are therefore provided with cooling systems for cooling the batteries such that the temperature does not reach above a critical temperature. However, emergency situations may arise in which the battery temperature rises above this critical temperature and a resulting thermal runaway occurs. During such a thermal runaway, the battery temperature increases rapidly in an uncontrolled manner, which may lead to severe damages on the vehicle and which may ultimately cause a fire. Therefore, it is crucial to be able to efficiently cool the batteries if there are signs of a thermal runaway.

DE 10 2016 223004 discloses an emergency cooling system for an energy storage system (ESS). The emergency cooling system comprises a reservoir in which emergency coolant is stored during normal operation of the vehicle. In an emergency situation, the emergency coolant is caused to flow into an emergency cooling path in which it cools the battery cells.

CN103779629 discloses another emergency cooling system for an ESS, in which a cooling medium is selected such that it also has a fire extinguishing function. A valve is provided for releasing the cooling medium into a space in which battery units of the ESS are located upon detection of an emergency.

SUMMARY

A primary object of the invention is to provide an in at least some aspect improved electric energy storage system for a vehicle and an in at least some aspect improved method for emergency cooling of such a system. In particular, it is an object to provide such a system and method by means of which efficient cooling is achieved in a quick and space efficient manner.

According to a first aspect of the invention, at least the primary object is at least partly achieved by means of an electric energy storage system for a vehicle according to claim 1. The electric energy storage system comprises:

- at least one battery unit,
- a casing enclosing the at least one battery unit,
- a cooling system comprising at least one coolant conduit arranged for cooling of the at least one battery unit during normal operation of the energy storage system by circulating coolant fluid through the at least one coolant conduit,
- a means for detecting a thermal runaway within the electric energy storage system,
- a valve arrangement being configured to respond to the detection of a thermal runaway by releasing coolant fluid from the cooling system into the casing.

The electric energy storage system further comprises a foam-forming substance being configured to produce a foam when coming into contact with the coolant fluid and/or when the coolant fluid is released into the casing.

An electric energy storage system (ESS) in which efficient emergency cooling is achieved by producing a fire-extinguishing cooling foam within the casing is thereby provided, the foam being formed by pockets of gas trapped within a liquid thin film.

The coolant fluid within the cooling system is released into the casing as a thermal runaway is detected such that the foam is produced, which foam fills the casing and comes into contact with the at least one battery unit. The coolant fluid is allowed to flood the casing such that the produced foam fills up the available space therein, thereby providing a large contact surface between the foam and the at least one battery unit. A very efficient cooling is thereby provided. The foam fills the casing more rapidly than a liquid, and thereby provides a more efficient cooling than a system in which only coolant fluid is released into the casing. Further, the foam also fills all spaces of the casing more efficiently and covers surfaces of the battery unit(s) independently on how the ESS is tilted. This is beneficial in particular if the vehicle falls over as the result of an accident.

Since the coolant fluid is provided into the casing via the valve arrangement, the casing may remain closed during emergency cooling, such that leakage of hazardous gas generated during a thermal runaway, as well as leakage of the coolant fluid are prevented. Safety around the ESS is thereby improved compared to cooling strategies involving destruction of the casing.

In some embodiments, the foam-forming substance is also released into the casing as the thermal runaway is detected. The foam-forming substance may in this case either be contained within the coolant fluid, or it may be provided separately from the coolant fluid. If the foam-forming substance is contained within the coolant fluid, it is configured to produce a foam as the coolant fluid is released into the casing from its confined space within the coolant conduit, thereby being allowed to expand and produce the foam.

In other embodiments, the foam-forming substance may be present within the casing prior to the thermal runaway.

The at least one battery unit may herein be understood as at least one battery cell, or as at least one battery module or battery pack, each comprising a plurality of battery cells. Typically, a plurality of battery units, in particular a plurality of battery cells, are provided within the ESS. When the coolant fluid is allowed to flood the casing and when the foam is formed therein, the coolant fluid and the produced foam may advantageously come into contact with all individual battery cells such that efficient cooling is provided.

The foam-forming substance may be in solid or liquid form. When the foam-forming substance is in solid form, it may optionally be disposed as a coating inside the casing. When the coolant fluid exits the coolant conduit and enters the casing, it will come into contact with the coating consisting of the foam-forming substance, and the foam will thereby be produced.

Optionally, the foam-forming substance may instead be disposed within a container or a vessel arranged inside or outside of the casing. In this case, the foam-forming substance must be released upon detection of a thermal runaway such that it comes into contact with the coolant fluid. The foam-forming substance may in this case be in liquid or in solid form. The vessel may comprise a valve or similar configured to open in response to the detection of the thermal runaway and release the foam-forming substance into the casing.

Optionally, the foam-forming substance may be a pressurized foam-forming substance, said vessel being a pressure vessel containing the pressurized foam-forming substance, wherein the pressure vessel is configured to respond to the detection of a thermal runaway by releasing the pressurized foam-forming substance into the casing.

Optionally, the pressure vessel may comprise a pressure vessel valve configured to open in response to the detection of the thermal runaway. The pressure vessel valve may be mechanically or electronically actuated in response to the detection of the thermal runaway. Alternatively, the pressure vessel valve may comprise a bimetallic element or similar, i.e. an element comprising at least two different materials having different thermal expansion properties. The pressure vessel valve may in this case be thermally actuated, so that it is automatically opened when the temperature reaches a certain threshold. In this case, the pressure vessel valve comprise a means for detecting a thermal runaway. Similarly, the pressure vessel valve may comprise an element configured to melt at the occurrence of a thermal runaway, such that the pressurized foam-forming substance is released into the casing.

Optionally, the pressure vessel may be located within the casing.

Optionally, the coolant conduit extends between an inlet opening and an outlet opening, the inlet opening and the outlet opening being configured to be fluidly connected to a vehicle cooling system of the vehicle. In this way, coolant fluid from the vehicle cooling system may be used for emergency cooling of the electric energy storage system. The vehicle cooling system may be arranged for cooling also other components of the vehicle, such as an internal combustion engine in case the vehicle is a hybrid vehicle.

Optionally, the valve arrangement is configured to be connected to the vehicle cooling system. Thus, the valve arrangement is arranged in the inlet and outlet openings and fluidly connects the coolant conduit to the vehicle cooling system.

Optionally, each valve of the valve arrangement is movable between at least an emergency position in which it is configured to fluidly connect the cooling system to an interior of the casing, and a normal operation position in which it is configured to fluidly seal the interior of the casing from the cooling system such that coolant fluid is circulated through the at least one coolant conduit. In the emergency position, the valve arrangement may be configured to fluidly seal the coolant conduit from the cooling system, such that the coolant conduit is fluidly bypassed. At least one valve of the valve arrangement may also be irreversibly movable from the normal operation position to the emergency position, such that once the at least one valve has been moved to the emergency position, the normal operation position may not be resumed. The valves may be mechanically or electronically actuated in response to the detection of the thermal runaway. Alternatively, the valves may comprise a bimetallic element or similar, i.e. an element comprising at least two different materials having different thermal expansion properties. The valves may in this case be thermally actuated, so that they are automatically moved to the emergency position when the temperature reaches a certain threshold. In this case, the valves comprise the means for detecting a thermal runaway. Similarly, the valves may comprise an element configured to melt at the occurrence of a thermal runaway, such that the coolant fluid is released into the casing.

Optionally, said valve arrangement fluidly seals the coolant conduit from the vehicle cooling system in the emergency position, such that the coolant conduit is fluidly bypassed.

Optionally, the valve arrangement comprises at least one inlet valve and at least one outlet valve. It is thereby ensured that coolant fluid may circulate within the ESS after initial foam production and efficiently remove generated heat therefrom. Two or more inlet valves and/or two or more outlet valves may also be provided.

Optionally, each one of the at least one inlet valve is arranged in the inlet opening of an associated one of the at least one coolant conduit, and each one of the at least one outlet valve is arranged in the outlet opening of an associated one of the at least one coolant conduit. In the normal operation position, each one of the at least one inlet valve and each one of the at least one outlet valve may be configured to fluidly connect the associated coolant conduit to the cooling system of the vehicle. The same valves may thereby be used for cooling during normal operation as during emergency cooling of the ESS. Alternatively, it is possible to arrange the valves separately from the inlet and outlet openings of the coolant conduit.

Optionally, the electric energy storage system further comprises a baffle configured to, when the coolant fluid is released into the casing, direct the coolant fluid from the at least one inlet valve to the at least one outlet valve via the at least one battery unit. The baffle ensures that the coolant fluid comes into contact with all individual battery units of the ESS. The baffle may e.g. be a ridge or a wall provided within the casing.

The foam-forming substance may be a surfactant, such as anionic surfactant or cationic surfactant or a mixture of these. As an example of an anionic surfactant alkyl sulphates may be mentioned. An example of a cationic surfactant is quaternary ammonium salts.

The coolant fluid may be a liquid having a high heat transfer coefficient such that the heat generated during energy transfer to and from the battery unit is transported in an efficient manner. The coolant fluid may be a mixture of water and at least one antifreeze agent, such as ethylene glycol, propylene glycol, propylene glycol methyl ether or glycerol. Further, the coolant fluid may comprise additives such as lubricants, corrosion inhibitors and dyes. The ratio of water to the antifreeze agent may be 50:50, i.e. water and antifreeze agent are mixed in equal proportions. Further, the ratio of water to the antifreeze agent may be 60:40, 40:60, or 30:70.

Optionally, the means for detecting a thermal runaway comprises at least one temperature sensor. Several temperature sensors may also be provided. The at least one temperature sensor may be configured for measuring a temperature of the ESS, such as to continuously monitor a temperature of the ESS.

Optionally, the means for detecting a thermal runaway comprises at least one gas sensor. Upon a thermal runaway, gas resulting from a thermal runaway chemical reaction may be emitted from the battery cells and the gas detector may be configured to detect the presence of such a gas.

Optionally, the electric energy storage system further comprises an electronic control unit configured for controlling at least the valve arrangement. The electronic control unit may further be configured to receive data from temperature sensor(s) and/or gas sensor(s) of the ESS. It may also be configured to control a pressure vessel valve of the pressure vessel, such as to open the valve in response to the detection of a thermal runaway.

Optionally, the means for detecting a thermal runaway is configured to determine that a thermal runaway occurs when a temperature of the energy storage system is above a predetermined temperature threshold, and/or when a temperature gradient is above a predetermined temperature gradient threshold. This is an accurate way of determining that a thermal runaway occurs.

According to a second aspect of the present invention, at least the primary object is achieved by a method for emergency cooling of an electric energy storage system of a vehicle according to claim 13. The method comprises the steps of:

- providing an energy storage system comprising:
  - at least one battery unit,
  - a casing enclosing the at least one battery unit,
  - a cooling system comprising at least one coolant conduit arranged for cooling of the at least one battery unit during normal operation of the energy storage system by circulating coolant fluid through the at least one coolant conduit,
  - a means for detecting a thermal runaway within the electric energy storage system,
  - a valve arrangement being configured to respond to the detection of a thermal runaway by releasing coolant fluid from the cooling system into the casing; and
  - a foam-forming substance being configured to produce a foam when coming into contact with the coolant fluid and/or when the coolant fluid is released into the casing,
- detecting a thermal runaway within the electric energy storage system,
- in response to said detection, controlling the valve arrangement to release coolant fluid from the cooling system into the casing.

Effects and features of the second aspect of the invention are largely analogous to those described above in connection with the first aspect. Thus, the method may be carried out for an electric energy storage system according to any one of the above described embodiments of the first aspect.

Optionally, the step of detecting the thermal runaway comprises:

- monitoring a temperature within the electric energy storage system,
- determining that a thermal runaway occurs when the monitored temperature fulfills at least one predetermined condition.

Optionally, the at least one predetermined condition is considered to be fulfilled when the monitored temperature is above a predetermined temperature threshold, and/or when a temperature gradient of the monitored temperature is above a predetermined temperature gradient threshold.

Optionally, the step of detecting the thermal runaway comprises:

- detecting gas resulting from a thermal runaway chemical reaction within the at least one battery unit.

Optionally, when the foam-forming substance is a pressurized foam-forming substance disposed within a pressure vessel of the energy storage system, the pressure vessel comprising a pressure vessel valve, the method further comprises:

- controlling the pressure vessel valve to assume its open state in response to said detection of the thermal runaway, thereby releasing the pressurized foam-forming substance from the pressure vessel into the casing such that the pressurized foam-forming substance comes into contact with the coolant fluid and a foam is produced.

According to a third aspect of the present invention, there is provided a control unit comprising means adapted to execute the steps of the method according to the second aspect of the invention. Effects and features of the third aspect of the invention are largely analogous to those described above in connection with the first aspect. The control unit may be an electronic control unit.

According to a fourth aspect of the present invention, there is provided a computer program comprising instructions to cause the control unit of the third aspect to execute the steps of the method according to the second aspect. Effects and features of the fourth aspect of the invention are largely analogous to those described above in connection with the first aspect.

According to a fifth aspect of the present invention, there is provided a computer-readable medium having stored thereon the computer program according to the fourth aspect. Effects and features of the fifth aspect of the invention are largely analogous to those described above in connection with the first aspect.

According to a sixth aspect of the present invention, there is provided a vehicle, such as a hybrid vehicle of a fully electrified vehicle, comprising an electric energy storage system according to the first aspect. Effects and features of the sixth aspect of the invention are largely analogous to those described above in connection with the first aspect.

The vehicle may be an electrical, hybrid, or plug-in hybrid vehicle comprising an electrical motor, wherein the energy storage system provides power to the electrical motor for providing propulsion for the vehicle. It is to be noted that the vehicle can therefore be either a partly or fully electrical vehicle.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

The drawings are schematic and not necessarily drawn to scale.

DETAILED DESCRIPTION OF EXAMPLE EMBODIMENTS OF THE INVENTION

In the present detailed description, various embodiments of the method according to the present invention are mainly described with reference to an all-electric bus, comprising a propulsion system in the form of battery powered electric motors. However, it should be noted that various embodiments of the described invention are equally applicable for a wide range of hybrid and electric vehicles.

Figure 1:
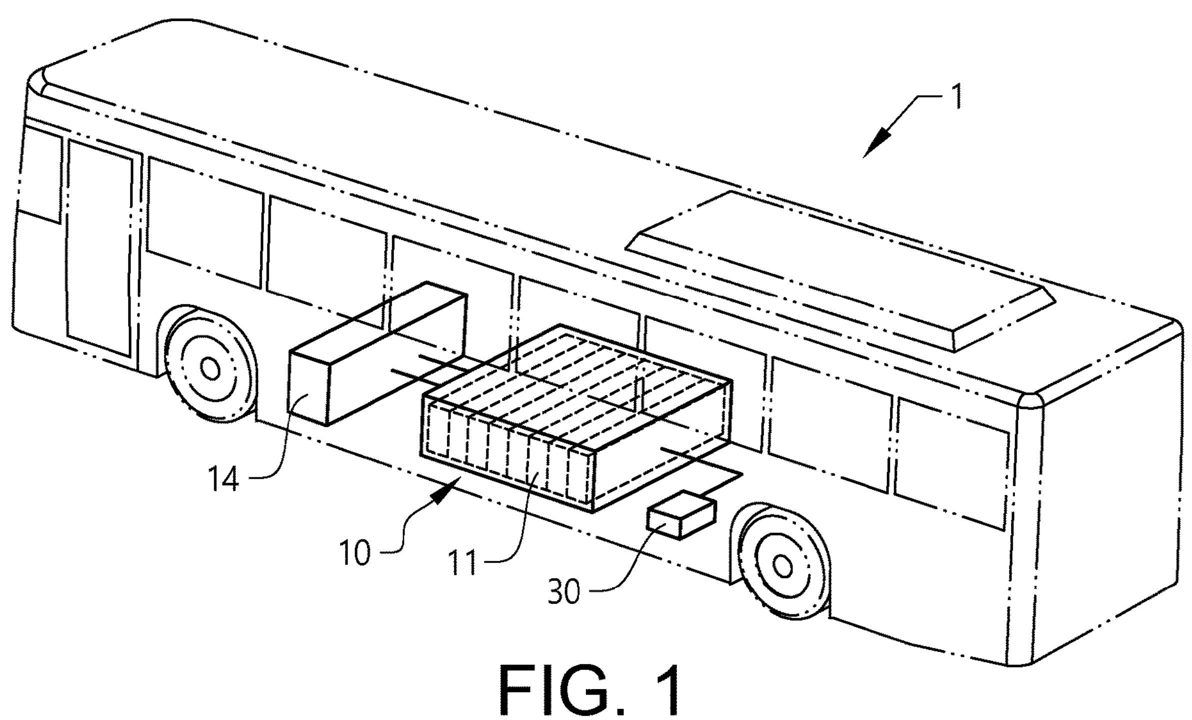
FIG. 1 shows a vehicle comprising an electric energy storage system according to an embodiment of the invention.

FIG. 1 shows a simplified perspective view of an all-electric vehicle in the form of a bus 1, which according to an embodiment is equipped with at least one electric machine (not shown) for propulsion of the bus.

The bus 1 carries an electric energy storage system (ESS) 10 comprising a battery unit in the form of a battery pack, the battery pack comprising a plurality of interconnected battery cells 11. Suitably, the battery cells 11 are of lithium-ion type, but other types may also be used. The number of battery cells 11 per battery pack may be in the range of 50 to 500 cells. It is to be noted that the ESS 10 may include a plurality of battery packs, wherein each battery pack comprises a plurality of battery cells.

The ESS 10 comprises a cooling system 14 configured for cooling of the ESS 10 by means of circulation of coolant fluid. The cooling system 14 of the ESS 10 may be a separate cooling system used for cooling of the ESS only, but it may optionally be integrated with or be connected to a cooling system of the vehicle 1, wherein the cooling system of the vehicle is configured for cooling of various systems and components within the bus 1, such as an internal combustion engine in case the vehicle 1 is a hybrid vehicle.

An ESS control unit 30 is configured for controlling the ESS 10 during operation of the bus 1. The ESS control unit 30 can also be configured for determining parameters indicating and controlling the condition or capacity of the ESS 10 and/or of battery packs thereof, such as state of charge (SOC), state of health (SOH), state of power (SOP) and state of energy (SOE).

Figure 3:
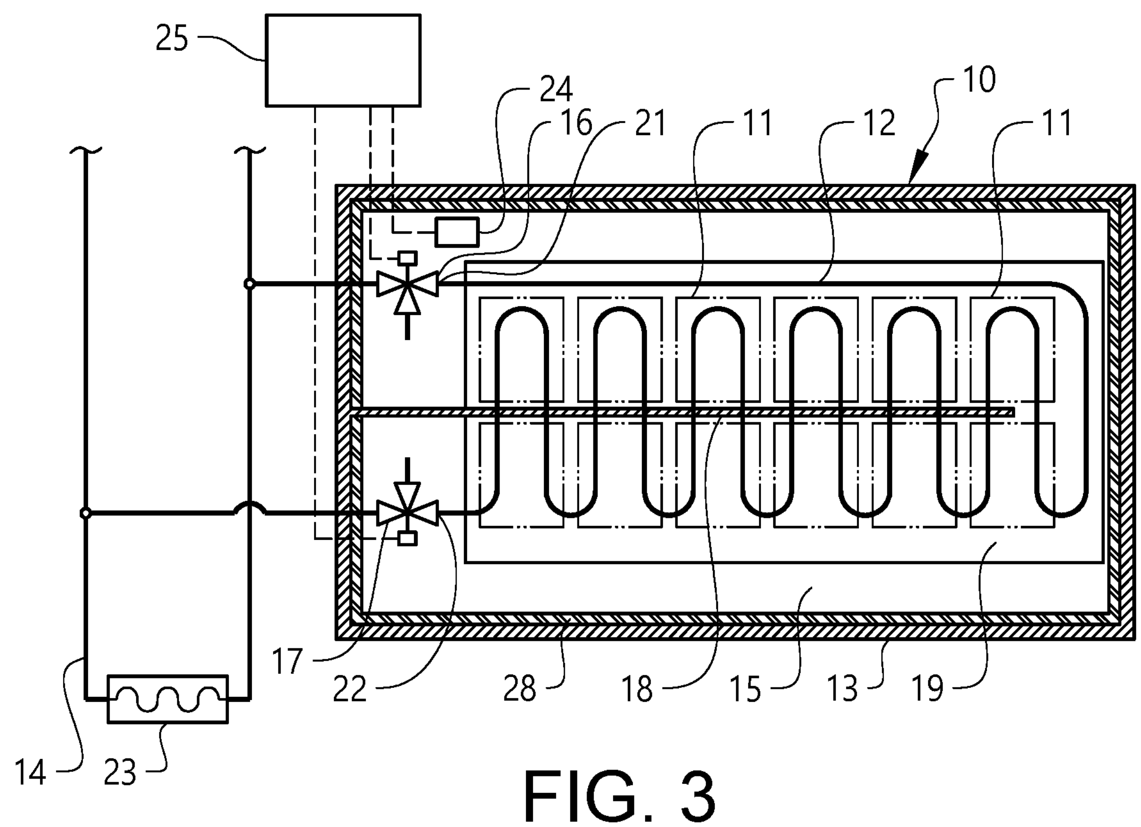

Reference is now made to FIG. 3, in which the ESS 10 of the bus 1 is schematically illustrated. The ESS 10 comprises a plurality of battery units 11 in the form of individual battery cells 11. For simplicity, only a few battery cells 11 are depicted, although the ESS may comprise several hundreds of battery cells. A casing 13 encloses the battery cells 11. A thermal insulation layer 15 may be provided within the casing 13.

The ESS comprises a cooling plate 19 provided within the casing 13, in which cooling plate 19 a coolant conduit 12 extends from an inlet opening 21 to an outlet opening 22. The inlet opening 21 and the outlet opening 22 are both fluidly connected to the cooling system 14. The battery cells 11 are arranged atop of the cooling plate 19, such that, during normal operation of the ESS 10, coolant fluid circulated in the coolant conduit 12 cools the battery cells 11 without being in contact with the battery cells 11 (also known as indirect cooling). At least one heat exchanger 23 is provided within the cooling system 14 for removal of heat from the coolant fluid.

A valve arrangement 16, 17 is further provided in the form of an inlet valve 16 and an outlet valve 17. In the shown embodiment, the inlet valve 16 and the outlet valve 17 are three-way valves, which are arranged in the inlet opening 21 and the outlet opening 22, respectively. Each valve 16, 17 is movable between an emergency position, in which it fluidly connects the cooling system 14 to an interior of the casing 13 and bypasses the coolant conduit 12, and a normal operation position in which it fluidly connects the coolant conduit 12 to the cooling system 14, and at the same time fluidly seals the interior of the casing 13 from the cooling system 14.

At an inside of the casing 13, a foam-forming substance is disposed as a coating 28. The coating 28 may cover an entire inner wall of the casing 13, or a portion thereof. It may also be disposed on some other surface within the casing 13. The foam-forming substance of the coating 28 is configured to produce a foam when coming into contact with the coolant fluid, as will be further described below.

Figure 4:
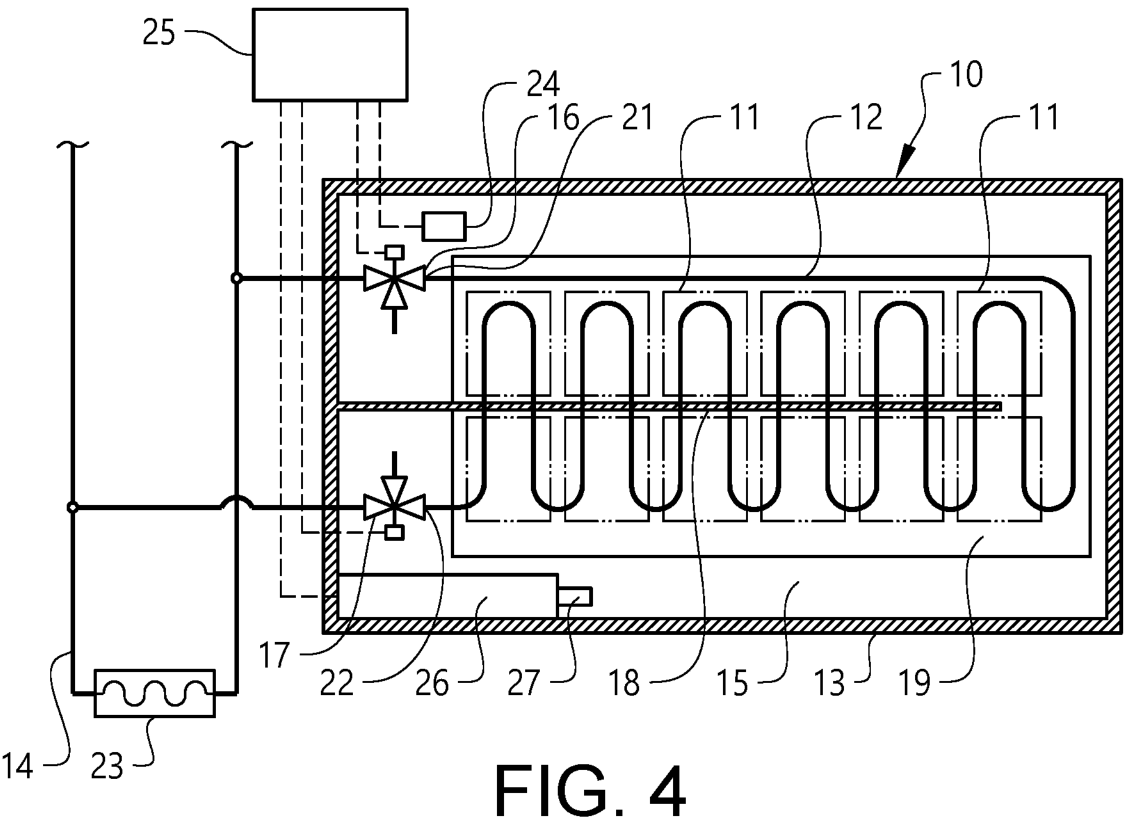

An ESS 10 according to another embodiment is shown in FIG. 4. The ESS 10 herein comprises a pressure vessel 26 having a pressure vessel valve 27 movable between a closed state and an open state. The pressure vessel 26 contains a pressurized foam-forming substance, such as a surfactant. The valve 27 is closed during normal operation of the ESS 10, such that no pressurized foam-forming substance is allowed to escape into the casing 13. The pressure vessel 26 may be provided within the casing 13, as in the shown embodiment, or alternatively outside of the casing 13 but with the pressure vessel valve configured and positioned such that it may be opened to release the pressurized foam-forming substance into the casing 13. The pressurized foam-forming substance is a substance that produces a foam when in contact with the coolant fluid of the cooling system 14.

In both of the embodiments shown in FIGS. 3 and 4, respectively, means for detecting a thermal runaway is further provided in the ESS 10. In the shown embodiments, the means for detecting a thermal runaway comprises a temperature sensor 24, which is connected to an electronic control unit 25 to which it is configured to communicate temperature data. The temperature sensor 24 is mounted within the casing 13. The control unit 25 is in the shown embodiments configured to, based on the communicated temperature data, determine whether a thermal runaway occurs. For example, it may be configured to determine that a thermal runaway occurs when the temperature measured by the temperature sensor 24 is above a predetermined temperature threshold, and/or when a temperature gradient is above a predetermined temperature gradient threshold, i.e. when the detected temperature increases rapidly. The electronic control unit 25 is in the shown embodiments further arranged for controlling the valve arrangement 16, 17, and in the embodiment shown in FIG. 4 also the pressure vessel valve 27.

The means for detecting a thermal runaway may also comprise a gas sensor (not shown) configured for detecting gas resulting from a thermal runaway chemical reaction within the battery cells 11. Alternatively or additionally, the inlet and/or outlet valves 16, 17, as well as the pressure vessel valve 27, if applicable, may be configured to automatically release the coolant fluid and the pressurized foam-forming substance, respectively, as the temperature within the casing 13 increases above a predetermined threshold level, for example by melting or by deforming as a result of the elevated temperature.

If it is determined that a thermal runaway occurs within the ESS 10, the control unit 25 moves the inlet valve 16 and/or the outlet valve 17 to the emergency position. Preferably, both of the valves 16, 17 are moved to the emergency position. Coolant fluid from the cooling system 14 is thereby released into the casing 13, such that the coolant fluid floods the casing 13. A baffle 18 is provided within the casing 13, which guides the coolant fluid from the inlet opening 21 to the outlet opening 22 via the battery cells 11.

In the first embodiment shown in FIG. 3, the coolant fluid flooding the casing 13 comes into contact with the coating 28 so that a foam is thereby produced, filling the casing 13.

Figure 5:
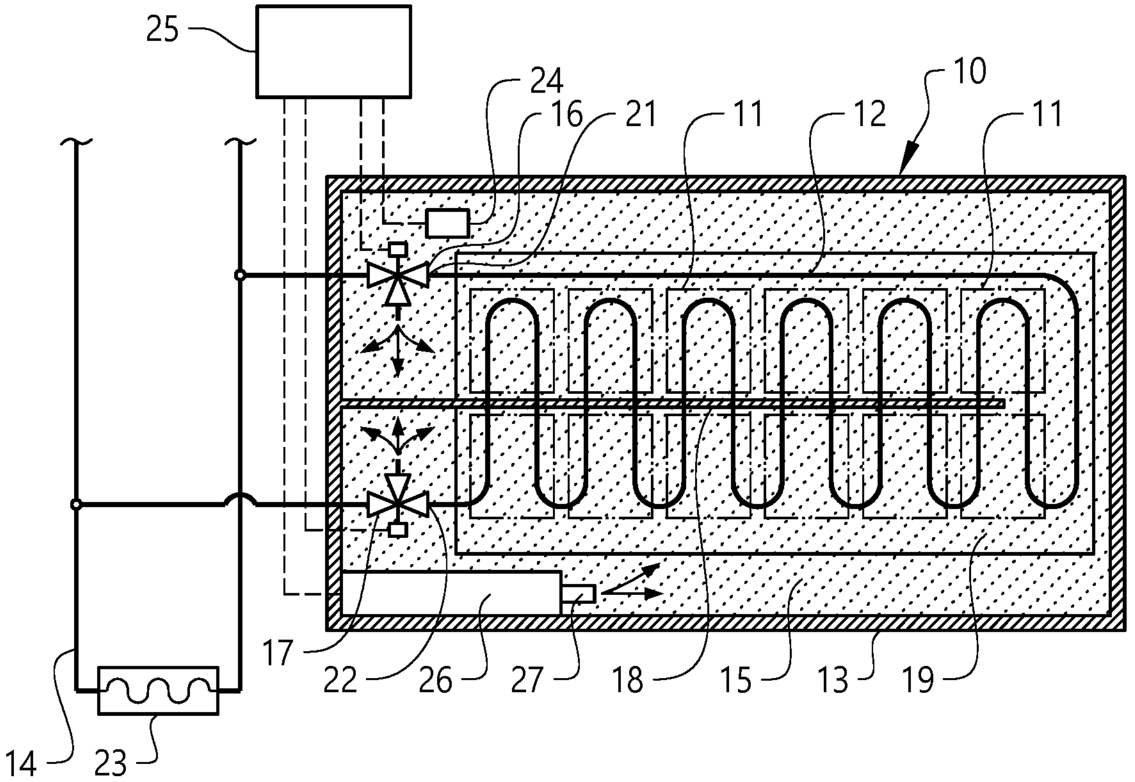

In the second embodiment shown in FIG. 4, the pressure vessel valve 27 is also opened in response to the detection of the thermal runaway, such that the pressurized foam-forming substance is released into the casing 13, where it interacts with the coolant fluid to produce a foam. FIG. 5 shows the ESS 10 of the second embodiment as a thermal runaway has been detected. The valves 16, 17 have been moved to the emergency position, the pressure vessel valve 27 has been opened, and the casing 13 has been filled with foam.

In both embodiments, the produced foam rapidly fills the casing 13 after the detection of the thermal runaway. The foam thereby comes into direct contact with the battery cells 11, covering the surfaces thereof, and efficiently cools the battery cells 11.

Figure 2:
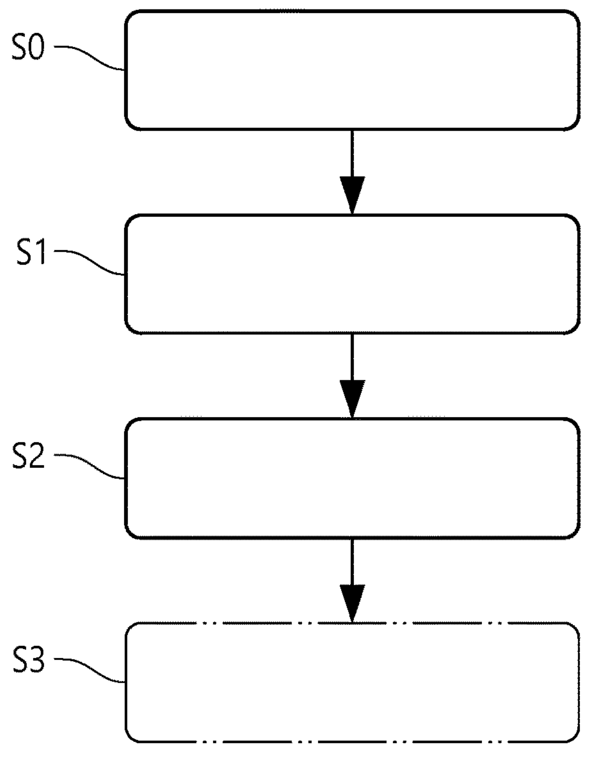
FIG. 2 is a flow-chart illustrating a method according to an embodiment of the invention, FIG. 3 schematically illustrates an electric storage system according to a first embodiment of the invention during normal operation, FIG. 4 schematically illustrates an electric storage system according to a second embodiment of the invention during normal operation and FIG. 5 schematically illustrates the electric storage system of FIG. 4 during a thermal runaway.

A method for emergency cooling of the ESS 10 according to an embodiment of the invention is illustrated in FIG. 2. The method comprises the following steps:

S0: Providing an energy storage system (ESS) 10 as described above.

S1: Detecting a thermal runaway within the ESS 10. This may e.g. be carried out by monitoring a temperature within the ESS 10 using the temperature sensor 24, and determining that a thermal runaway occurs when the monitored temperature fulfills at least one predetermined condition, such as when the monitored temperature is above a predetermined temperature threshold, and/or when a temperature gradient of the monitored temperature is above a predetermined temperature gradient threshold. A thermal runaway may also be detected by detecting gas resulting from a thermal runaway chemical reaction within the battery cells 11. It is also possible to use a combination of temperature monitoring and gas detection for detecting the thermal runaway.

S2: In response to said detection of the thermal runaway, controlling the valve arrangement 16, 17 to release coolant fluid from the coolant conduit 12 into the casing 13.

In case of the second embodiment depicted in FIG. 4, the method may further comprise the additional step:

S3: In response to said detection, controlling the pressure vessel valve 27 to assume its open state, thereby releasing the pressurized foam-forming substance from the pressure vessel 26 into the casing 13 such that the pressurized foam-forming substance comes into contact with the coolant fluid and a foam is produced. The pressure vessel valve 27 is thus moved from its closed state, in which the pressurized foam-forming substance is contained within the pressure vessel 26, to its open state, in which the pressurized foam-forming substance is released.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The electronic control unit 25 may include a microprocessor, a microcontroller, a programmable digital signal processor or another programmable device. Thus, the electronic control unit 25 comprises electronic circuits and connections (not shown) as well as processing circuitry (not shown) such that the electronic control unit 25 can communicate with different parts of the ESS 10 or with different control units of the bus 1. The electronic control unit 25 may comprise modules in either hardware or software, or partially in hardware or software, and communicate using known transmission buses such as a CAN-bus and/or wireless communication capabilities. The processing circuitry may be a general purpose processor or a specific processor. The electronic control unit 25 comprises a non-transitory memory for storing computer program code and data. Thus, the skilled person realizes that the electronic control unit 25 may be embodied by many different constructions.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electric vehicle, in particular an electric truck or the like.

The invention claimed is:

1. An electric energy storage system for a vehicle, comprising:

at least one battery unit, a casing enclosing the at least one battery unit, a cooling system comprising at least one coolant conduit arranged for cooling of the at least one battery unit during normal operation of the energy storage system by circulating a liquid coolant fluid through the at least one coolant conduit, a means for detecting a thermal runaway within the electric energy storage system, a valve arrangement being configured to respond to the detection of a thermal runaway by releasing the liquid coolant fluid from the cooling system into the casing; wherein, the electric energy storage system further comprises a foam-forming substance provided separately from the liquid coolant fluid, the foam forming substance being configured to produce a foam when coming into contact with the liquid coolant fluid when the liquid coolant fluid is released into the casing.

2. The electric energy storage system according to claim 1, wherein the foam-forming substance is disposed as a coating inside the casing.

3. The electric energy storage system according to claim 1, wherein the foam-forming substance is disposed within a vessel being arranged inside or outside of the casing.

4. The electric energy storage system according to claim 3, wherein the foam-forming substance is a pressurized foam-forming substance, said vessel being a pressure vessel containing the pressurized foam-forming substance, wherein the pressure vessel is configured to respond to the detection of a thermal runaway by releasing the pressurized foam-forming substance into the casing.

5. The electric energy storage system according to claim 1, wherein each valve of the valve arrangement is movable between at least an emergency position in which it is configured to fluidly connect the cooling system to an interior of the casing, and a normal operation position in which it is configured to fluidly seal the interior of the casing from the cooling system such that coolant fluid is circulated through the at least one coolant conduit.

6. The electric energy storage system according to claim 1, wherein the valve arrangement comprises at least one inlet valve and at least one outlet valve.

7. The electric energy storage system according to claim 6, further comprising a baffle configured to, when the coolant fluid is released into the casing, direct the coolant fluid from the at least one inlet valve to the at least one outlet valve via the at least one battery unit.

8. The electric energy storage system according to claim 1, wherein the foam-forming substance is a surfactant.

9. The electric energy storage system according to claim 1, wherein the means for detecting a thermal runaway comprises at least one temperature sensor.

10. The electric energy storage system according to claim 1, wherein the means for detecting a thermal runaway comprises at least one gas sensor.

11. The electric energy storage system according to claim 1, further comprising an electronic control unit configured for controlling at least the valve arrangement.

12. The electric energy storage system according to claim 1, wherein the means for detecting a thermal runaway is configured to determine that a thermal runaway occurs when a temperature of the energy storage system is above a predetermined temperature threshold, and/or when a temperature gradient is above a predetermined temperature gradient threshold.

13. A method for emergency cooling of an electric energy storage system of a vehicle, the method comprising the steps of:

providing an energy storage system comprising:

at least one battery unit, a casing enclosing the at least one battery unit, a cooling system comprising at least one coolant conduit arranged for cooling of the at least one battery unit during normal operation of the energy storage system by circulating the liquid coolant fluid through the at least one coolant conduit, a means for detecting a thermal runaway within the electric energy storage system, a valve arrangement being configured to respond to the detection of a thermal runaway by releasing the liquid coolant fluid from the cooling system into the casing; and a foam-forming substance provided separately from the liquid coolant fluid, the foam forming substance being configured to produce a foam when coming into contact with the liquid coolant fluid when the coolant fluid is released into the casing, detecting a thermal runaway within the electric energy storage system, in response to said detection, controlling the valve arrangement to release the liquid coolant fluid from the cooling system into the casing.

14. The method according to claim 13, wherein the step of detecting the thermal runaway comprises:

monitoring a temperature within the electric energy storage system, determining that a thermal runaway occurs when the monitored temperature fulfills at least one predetermined condition.

15. The method according to claim 14, wherein the at least one predetermined condition is considered to be fulfilled when the monitored temperature is above a predetermined temperature threshold, and/or when a temperature gradient of the monitored temperature is above a predetermined temperature gradient threshold.

16. The method according to claim 13, wherein the step of detecting the thermal runaway comprises:

detecting gas resulting from a thermal runaway chemical reaction within the at least one battery unit.

17. The method according to claim 13, wherein the foam-forming substance is a pressurized foam-forming substance disposed within a pressure vessel of the energy storage system, the pressure vessel comprising a pressure vessel valve, the method further comprising:

controlling the pressure vessel valve to assume its open state in response to said detection of the thermal runaway, thereby releasing the pressurized foam-forming substance from the pressure vessel into the casing such that the pressurized foam-forming substance comes into contact with the coolant fluid and a foam is produced.

18. A control unit comprising means adapted to execute the steps of the method according to claim 13.

19. A non-transitory computer-readable medium having stored thereon a computer program comprising instructions to cause a control unit to execute the method according to claim 13.

20. A vehicle comprising an electric energy storage system according to claim 1.

* * * * *